Sept. 26, 1939.  J. L. GONARD  2,174,320
SPRING SUSPENSION
Filed Jan. 17, 1939
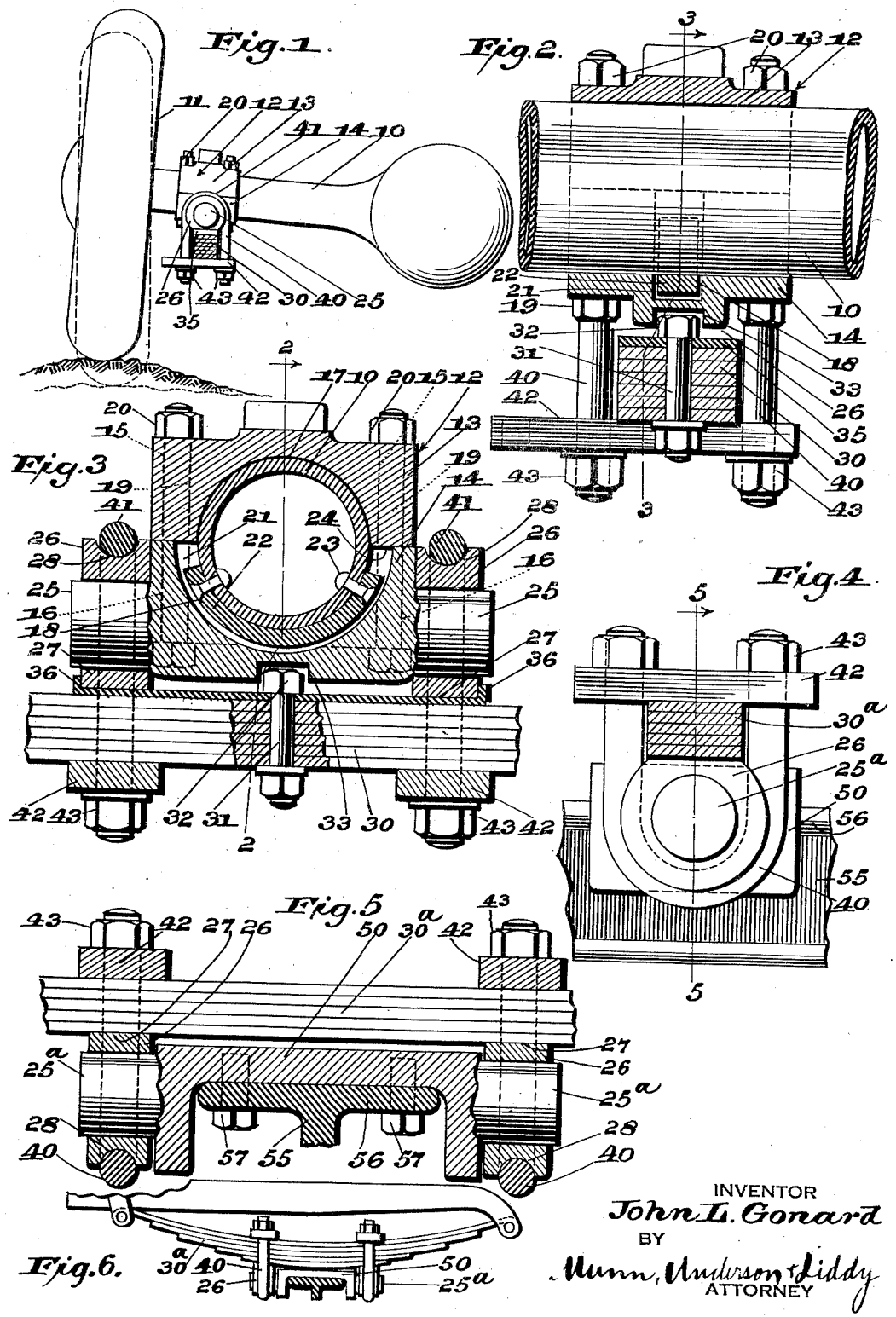
INVENTOR
John L. Gonard
BY
Munn, Anderson & Liddy
ATTORNEY Patented Sept. 26, 1939

2,174,320

UNITED STATES PATENT OFFICE 2,174,320

SPRING SUSPENSION

John Louis Gonard, Englewood Cliffs, N. J.

Application January 17, 1939, Serial No. 251,445

3 Claims. (Cl. 267—52)

This invention relates to a spring suspension.

It has been proposed to provide saddles or hangers for the intermediate portions of leaf springs on the axles of the axle housings of automobiles but these supports permit only the spring to pivot in a vertical plane passing longitudinally of the spring.

Furthermore, such type of supports for leaf springs cause an uneven rocking of the body between the front and rear ends which would be dangerous and which would cause discomfort to the occupants of the vehicle.

It also has been proposed to provide a saddle which is rigidly connected to the spring and which has its ends straddling the axle to permit a constricted rocking of the springs to prevent torsion but this construction again will permit the body to sway back and forth transversely so that when the vehicle is passing around a curve the body will have a tendency to swing laterally too far which may cause the vehicle to upset.

It is an object of the invention to provide a connection between an intermediate portion of a compound leaf spring for vehicles and the axles so that when one wheel is raised by a hump in the roadbed the springs may be maintained in their normal horizontal positions without causing distortion of the spring but the spring will be limited in its transverse rocking movement to prevent undue tilting or side sway of the body.

A further object of the invention is the provision of a device for connecting compound leaf springs to an axle or an axle housing of a vehicle in which a block is rigidly connected to the axle and provided with laterally disposed stub axles upon which are rotatably mounted a sectional grooved bearing receiving the curved bight portion of a U-bolt which connects the intermediate portion of the spring to the bearings so that the spring may rock transversely within predetermined limits to eliminate distortion of the spring to provide for greater comfort of riding of the occupants of the car while preventing the body from tilting outwardly.

A still further object of the invention is to provide a spring suspension for vehicles in which the compound leaf springs are so mounted that they will rock transversely to eliminate torsion on the spring including a block which is secured directly to the front axle or connected to the rear axle housing, said block having stub axles upon opposite sides of the axle to receive grooved bearings which have a flattened portion adapted to be clamped directly onto the intermediate portion of the leaf spring, the clamping means including a U-shaped member received by the groove in the bearings with plates and nuts for rigidly securing the bearings to the spring.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a rear view of an axle partly in section showing the position of the leaf spring when the axle or housing is tilted, Figure 2 is a vertical section taken along the line 2—2 of Fig. 3, Figure 3 is a longitudinal vertical section taken along the line 3—3 of Fig. 2.

Figure 4 is a front elevation, partly in section, of the front spring support,

Figure 5 is a longitudinal vertical section taken along the line 5—5 of Figure 4, and Figure 6 is a longitudinal side view of a spring suspension showing my invention applied thereto.

A block, generally designated by the numeral 12, is formed of two sections 13 and 14. The upper section is provided with vertical passages 15 which are adapted to be aligned with similarly positioned passages 16 for the lower section 14. The sections are also provided with semi-circular passages 17 and 18, respectively, which when aligned form a cylindrical passage to receive the axle housing 10. Bolts 19 are received by the aligned passages 15 and 16 for clamping the two sections together when nuts 20 are drawn up tight on the ends of said bolts. The section 13 has an auxiliary arcuate groove 21 which receives a curved spline 22 which is riveted or bolted at 23 to the axle housing 10. A shoulder 24 limits the movement of the block.

The section 14 is provided with laterally disposed stub axles 25 which are adapted to receive the bearings 26. These bearings are located upon opposite sides of the section 14 and also upon opposite sides of the axle housing 10.

Each bearing is provided with a flattened portion 27 at the lower portion thereof and is also provided with a peripheral groove 28.

A compound leaf spring, generally designated by the numeral 30 is bolted together, as shown at 31. The head 32 of the bolt is located within a groove 33 formed in the bottom of the section 14 of the block 12.

A plate 35 is also bolted to the intermediate portion of the spring 30 and is adapted to lie in flat contact with the flat bottoms of the bearing 26. It will be noted that the bottom portions of the bearings 26 extend below the bottom portion of the section 14 so that the plate 35 is spaced from the bottom of the section 14. The opposite ends of the plate 35 are bent upwardly, as shown at 36, and these ends are located near the outer faces of the bearing 26.

A pair of U-bolts, generally designed by the numeral 40, have a curved bight portion 41 which is received by the groove 28 in the bearings 26. The legs of the U-shaped bolt embrace opposite sides of the spring 30 and pass through perforations in plates 42 which are in engagement with the underface of the spring 30. The ends of the bolts are threaded and nuts 43 are screwed into the threaded ends of the bolts for drawing the bearings 26 tight upon the spring 30 so that the bearings are rigidly connected to said spring.

The operation of the device is as follows: When one of the wheels is elevated by a hump in the roadbed, as shown in Fig. 1, the end of the axle which is connected to the wheel will also be tilted upwardly so that the spring 30 is likewise raised. However, since the spring at this point is pivotally mounted upon the stub axles 25 at the opposite sides of the rear axle housing 10, the spring will maintain its horizontal position and the block 12 will only tilt at an angle to the vertical. The stub axles neatly fit the hubs of the bearings 26 and the small space between the bottom of the block 12 and the upper face of the spring 30 will limit the rocking of the spring and prevent the body of the car from being tilted at too great an angle.

The support is so constructed that the usual saddle for connecting the intermediate portion of the spring to the axle may be readily removed and the swinging support just described may be readily substituted without any change in the construction of the rear axle housing because the split block neatly fits the rear axle housing and as manufactured they will be so shaped that they will conform to the various makes of the cars now on the market.

In Figs. 4 and 5 is shown a form which has been modified only to the extent that it will conform to the various types of front axles.

Most of the axles of present day construction are in the form of an I-beam and the bolts necessarily employed for connecting the usual saddle of the front spring are removed to remove the normal construction and a plate or block 50 is substituted therefor which has laterally disposed stub axles 25a to receive the bearings 26 which are identical in construction to those shown in Figs. 1 to 3, inclusive. The U-bolts 40 are received within the grooves 28 of the bearings 26 while the flat portions 27 of the bearings are clamped rigidly onto the front spring 30a by means of the nuts 43 and the plates 42. It will be noted that there is a space between the upper surface of the block 50 and the underface of the spring 30a to permit rocking of the spring to a limited degree through the bearings 26. In other words only those necessary changes have been made in the construction in Figs. 1 to 3, inclusive, to adapt it to the varying conditions of the front axle 55. In those cases where the top flanges 56 of the rear axle are not perforated to receive the bolts 57 this can be readily done.

The sections 13 and 14 of the block 12 are clamped together but they may rock as a unit on the housing but the rocking of the block is limited by the spline 22 and the shoulders 24 at the ends of the slot 21. This construction prevents side movement of the intermediate portions of the vehicle springs because the spline holds the block against lateral displacement on the housing.

I claim:

1. In a spring suspension for vehicles, means supporting the ends of the springs and rockably mounting the middle portion of said springs comprising a block adapted to be connected transversely to a vehicle axle, stub axles projecting from the opposite ends of the block and beyond the sides of the vehicle axle, bearing on each stub axle, each bearing having a flattened portion engaging one face of a vehicle spring, the remaining peripheral portion of said bearing being provided with a groove, a U-bolt for each bearing having a curved bight portion received by the groove, a plate engaging the opposite face of the spring and having perforations receiving the legs of the U-bolt, and nuts threaded onto the legs for clamping the bearings on the springs.

2. In a spring suspension for vehicles, means supporting the ends of the springs and rockably mounting the middle portion of said springs comprising a block formed of sections which embrace the vehicle axle housing, means securing the sections in clamped relation on the housing, one of the sections having stub axles projecting upon opposite sides of the housing, bearings rockably supporting the stub axles and having the inner face thereof in contact with the adjacent end of the first-mentioned section, means securing the bearings to one face of the spring with the adjacent face of said section spaced from the spring, a plate secured to the spring and having flanges at the ends thereof adjacent the outer faces of the bearings, said spring being mounted for transverse rocking so that the torsion of said spring will be eliminated.

3. In a spring suspension for vehicles, means supporting the ends of the springs and rockably mounting the middle portion of said springs comprising a block formed of sections which embrace the vehicle axle housing, means securing the sections in clamped relation on the housing, one of the sections having stub axles projecting upon opposite sides of the housing, bearings rockably supporting the stub axles and having the inner face thereof in contact with the adjacent end of the first-mentioned section, each bearing having a flattened portion in engagement with one face of the vehicle spring and being of such a height as to space the inner face of the first section from the adjacent face of the spring, each bearing having a groove, a U-bolt having the bight portion received by the groove, means securing the U-bolts to the spring and clamping the bearings to said spring, a plate secured to the spring and having flanges at the ends thereof adjacent the outer faces of the bearings, said spring being mounted for transverse rocking so that torsion of said spring will be eliminated.

JOHN LOUIS GONARD.